United States Patent

Kuriyama et al.

[11] Patent Number: 5,743,828
[45] Date of Patent: Apr. 28, 1998

[54] FLUID COUPLING LOCK-UP CONTROL SYSTEM

[75] Inventors: Minoru Kuriyama, Higashihiroshima; Kazuo Sasaki, Hiroshima, both of Japan

[73] Assignee: Mazda Motor Corporation, Hiroshima, Japan

[21] Appl. No.: 530,459

[22] Filed: Sep. 18, 1995

[30] Foreign Application Priority Data

Sep. 19, 1994 [JP] Japan ................. 6-223029

[51] Int. Cl.⁶ ................. F16H 61/14; B60K 41/02
[52] U.S. Cl. ................. 477/169; 477/64; 477/180
[58] Field of Search ................. 477/62, 64, 65, 477/166, 168, 169, 174, 175, 176, 180; 192/3.31, 3.33

[56] References Cited

U.S. PATENT DOCUMENTS 4,725,951  2/1988  Niikura ................. 477/65
4,947,734  8/1990  Fujita et al. ................. 477/169
5,332,073  7/1994  Iizuka ................. 477/174
5,496,233  3/1996  Ishiguro ................. 477/180

FOREIGN PATENT DOCUMENTS 60-65952 of 1985 Japan.

*Primary Examiner*—Khoi Q. Ta
*Assistant Examiner*—Sherry Lynn Estremsky
*Attorney, Agent, or Firm*—Sixbey, Friedman, Leedom & Ferguson, PC; Gerald J. Ferguson, Jr.; Donald R. Studebaker

[57] ABSTRACT

A lock-up control system for a fluid coupling, interposed between an engine and automatic transmission, which includes a lock-up clutch and is locked up by the lock-up clutch so as to directly couple the engine and the automatic transmission together, sets an increase rate, at which a locking pressure increases during locking of said fluid coupling, small at an early stage of locking and large at a later stage of locking.

12 Claims, 8 Drawing Sheets

L/U LOCK

L/U UNLOCK

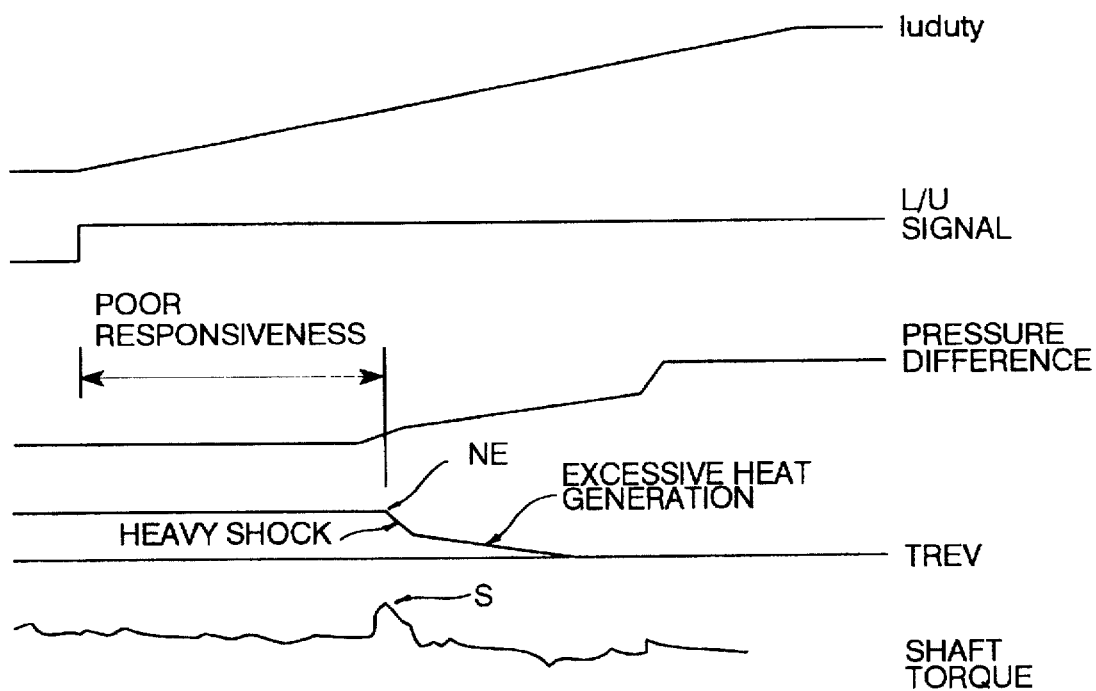

FLUID COUPLING LOCK-UP CONTROL SYSTEM

BACKGROUND OF THE INVENTION

1. Field of the Invention

The present invention relates to a lock-up control system for a fluid coupling which is interposed between an engine and an automatic transmission.

2. Description of Related Art

Automatic transmissions mounted in automobiles are typically provided with torque converters such as a fluid coupling which transmit engine revolutions to the automatic transmissions. In recent years, a lock-up clutch has been provided on such a torque converter. The engine and the automatic transmission are directly coupled through locking of the fluid coupling by the lock-up clutch under certain driving conditions. When the lock-up clutch, which locks up and unlocks the fluid coupling using hydraulic pressure, is simply operated, large locking shocks are generated.

Various types of control devices have been proposed to reduce such locking shocks. One of this kind of lock-up clutches is known from, for instance, Japanese Unexamined Patent Publication No. 60-65952. As shown in FIG. 10 illustrating a time chart, with the prior art lock-up control, a duty rate (luduty) which determines the amount of oil drain on from a solenoid valve according to a lock-up (L/U) signal is increased at a fixed ratio so as to discharge hydraulic pressure in a clutch chamber. In this way, through the discharge of hydraulic pressure in the clutch chamber, the lock-up clutch brings the fluid coupling into locking by the hydraulic pressure in the converter chamber.

However, in the prior art lock-up control device of for the fluid coupling, the force which causes locking operation of the lock-up clutch is increased at a fixed ratio as a result of an increase in the duty rate at a fixed ratio at a moment of locking up. Consequently, when the slope of a change of the duty rate is enhanced in an attempt to improve the responsiveness of locking, the moment of inertia of the lock-up clutch which has a large mass increases at the beginning of locking, so that, when the lock-up clutch starts to lock up the torque converter, the speed of engine revolution (NE) drops suddenly. Accordingly, a large or heavy shock (S) is created on shaft torque due to a change in engine speed. In addition, because the inertial force disappears after the lock-up clutch makes contact, the lock-up clutch is allowed to cause slippage as the locking force becomes smaller during an interval until the differential pressure rises to a predetermined pressure after the contact. In this instance, a problem arises that heat is generated due to such slippage, thereby making seizure of the lock-up clutch more easily caused.

SUMMARY OF THE INVENTION

It is an object of the present invention to provide a lock-up control system for a fluid coupling which varies locking pressure for causing locking of a lock-up clutch so that the locking pressure is initially made small and controls the influence of inertial force of the lock-up clutch in an early stage of locking, while in a later stage of locking, the locking pressure is made large so as to reduce slippage of the lock-up clutch relative to the fluid coupling after contact of the lock-up clutch relative to the fluid coupling.

The above and other objects of the present invention are achieved by providing a lock-up clutch control system for a fluid coupling, interposed between an engine and automatic transmission, which includes a lock-up clutch interposed between an engine torque input member and an engine torque output member is locked by the lock-up clutch so as to directly couple the engine and the automatic transmission together. The lock-up control system changes a locking pressure varying rate, at which the locking pressure for causing the lock-up clutch to lock the fluid coupling increases during locking, to be small in an early stage of locking and to be large in a later stage of locking.

Specifically, a time of transition from the early stage of locking to the later stage of locking is determined on the basis of the state of relative slippage between the engine and the automatic transmission, which may be slippage between the engine torque input member and an engine torque output member of the fluid coupling, a speed difference between an input speed of revolutions of the automatic transmission and an output speed of revolutions of the engine, or a speed ratio between the engine output speed of revolutions and the transmission input speed of revolutions.

During locking the fluid coupling, at least one of the locking pressure and the rate of locking pressure increase is determined based on at least one of an engine output torque, a speed of the engine torque output member of the fluid coupling, and a gear position to which the automatic transmission has been shifted. Further, the lock-up control system counts a predetermined time after the fluid coupling comes close to a state of slippage allowed when the fluid coupling is completely locked and develops the greatest level of locking pressure when counting up the predetermined time.

With the lock-up control system for a fluid coupling according to the present invention, because the rate of locking pressure increase is set small at the early stage of locking and large at the later stage of locking, the lock-up clutch causes its operation relatively slowly at an early stage of locking during locking of the lock-up clutch and, consequently, the inertial force acting on the lock-up clutch is reduced accompanying a great reduction in impact energy, suppressing dramatically fluctuations in engine revolutions and reducing shocks during locking up the fluid coupling. On the other hand, at the later stage of locking, the locking pressure increases relatively quickly, enabling the lock-up clutch firmly locks the fluid coupling with greatly reduced slippage after once it is brought into contact with the fluid coupling.

In addition, the determination of the time of transition between the early stage of locking for a small rate of locking pressure increase and the later stage of locking for a large rate of locking pressure increase is made on the basis of the state of slippage, the rate of locking pressure increase is timely changed. When the state of slippage is determined based on a speed ratio between the engine output speed and the transmission input speed, it is more accurate.

Together, when determining at least one of the rate of locking pressure increase and an initial value which determines the locking pressure of the lock-up clutch on the basis of at least one of the engine torque, the output speed of the fluid coupling and a gear position, the determination of the initial value or the rate of locking pressure increase is made simply in accordance with driving conditions.

The lock-up control system monitors the predetermined interval of time after an approximate achievement of locking so as to provide the greatest locking pressure, enabling the locking of the fluid coupling to be completed in a short period of time without shocks.

BRIEF DESCRIPTION OF THE DRAWINGS

The above and other objects of the present invention will be clearly understood from the following description in conjunction with the accompanying drawings, in which:

FIG. 10 is a time chart of various factors necessary to control elements necessary to perform locking and unlocking control of a prior art lock-up device.

DETAILED DESCRIPTION OF THE PREFERRED EMBODIMENTS

Figure 1:
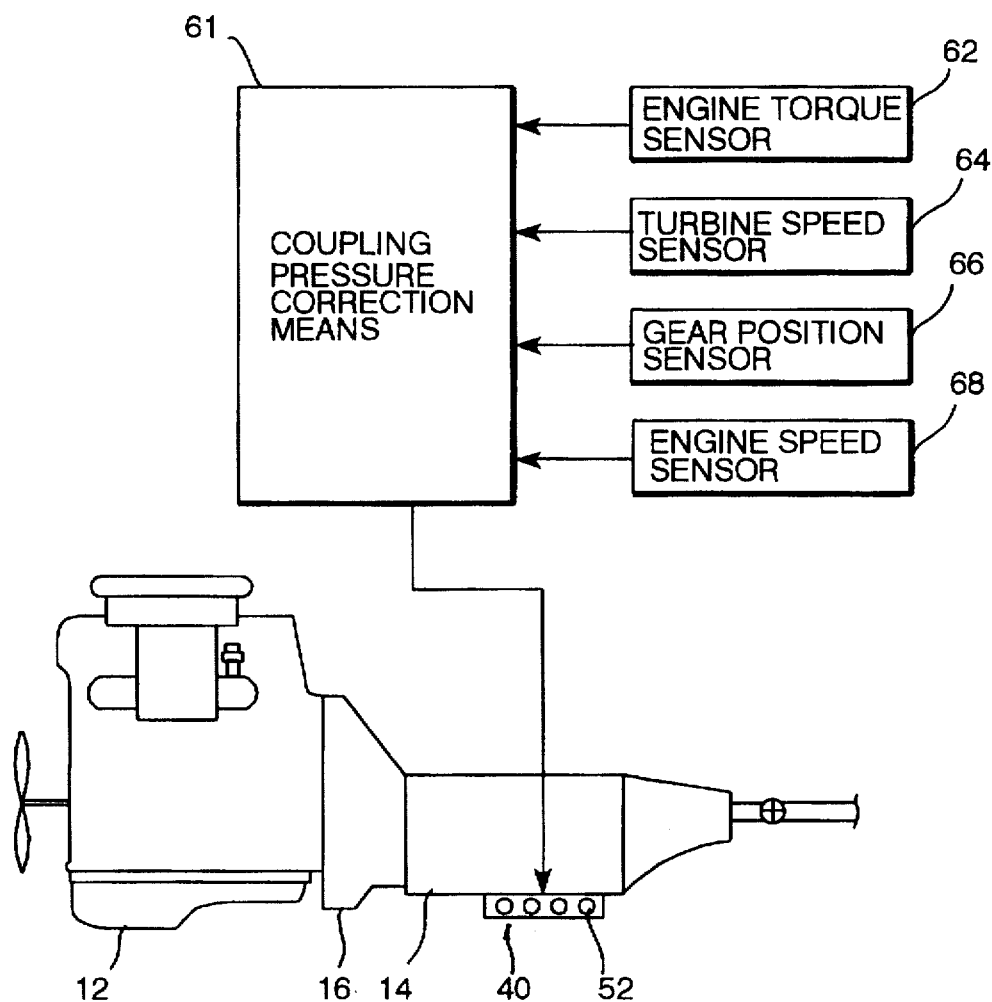
FIG. 1 is schematic illustration of an automatic transmission equipped with a lock-up control system in accordance with a preferred embodiment of the present invention.
Figure 2:
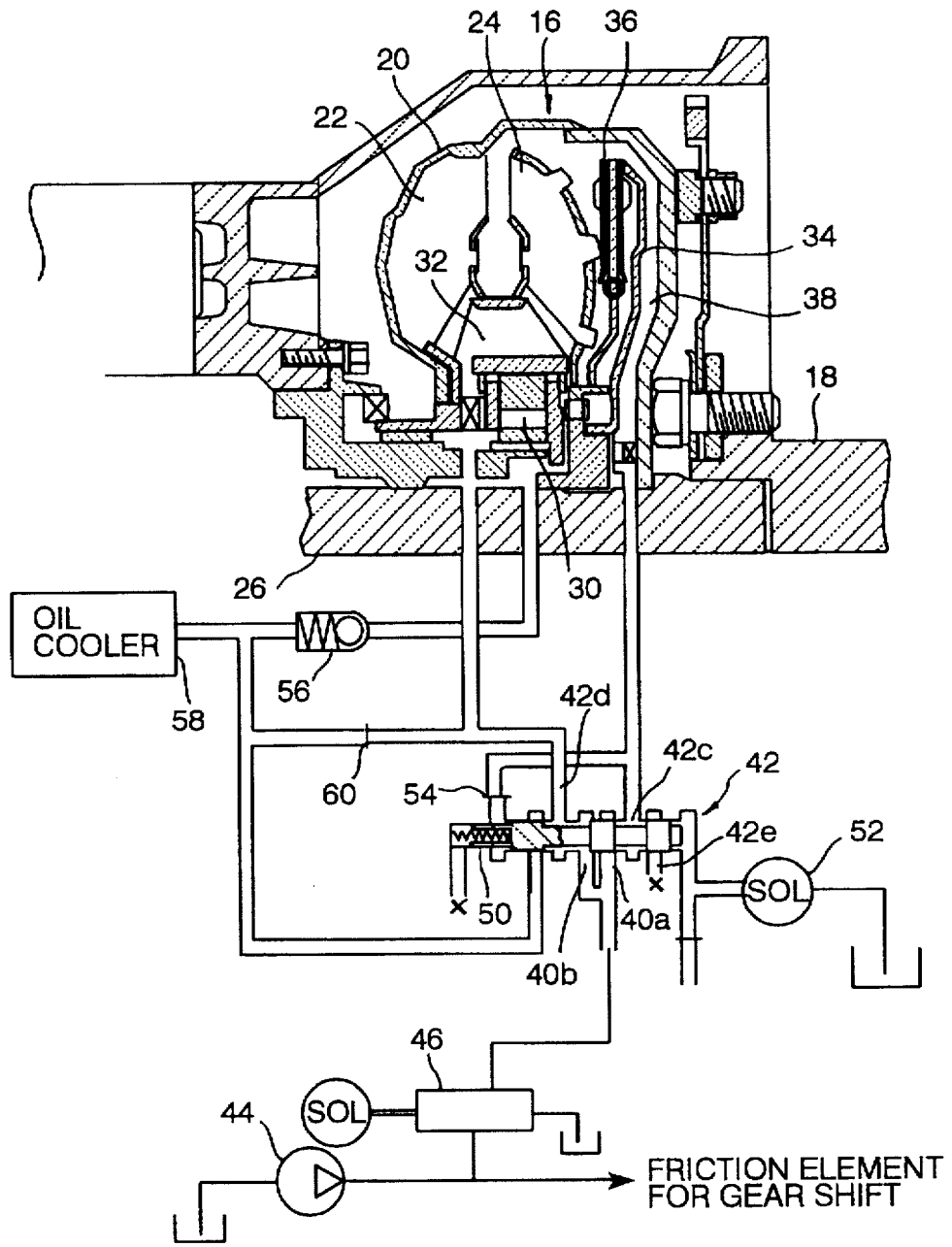
FIG. 2 is a cross-sectional view showing a torque converter controlled by the lock-up control system.

Referring to the drawings in detail, in particular to FIGS. 1 and 2 illustrating a lock-up control system according to a preferred embodiment of the present invention, the lock-up control system is used in lock-up control of a torque converter 16 as a fluid coupling interposed between an engine 12 and an automatic transmission 14. The torque converter 16 has a converter housing 20 joined to an output shaft 18 of the engine 12, as shown in detail in FIG. 2, a pump impeller 22 disposed on one side in the axial direction in the converter housing 20, which is filled with working oil, and a turbine runner 24 disposed oppositely the pump impeller 22. Furthermore, the turbine runner 24 is joined to an input shaft 26 of the automatic transmission 14. In addition, a stator 32 is provided between the pump impeller 22 and the turbine runner 24 and joined to the transmission housing 28 via a one-way clutch 30. Engine torque which is transferred from the pump impeller 22 to the turbine runner 24 via a torque transfer medium, i.e. the working oil, is magnified by the stator 32 in accordance with the relative difference in revolutions between the pump impeller 22 and the turbine runner 24.

On the other side of the converter housing 20 in the axial direction, a lock-up clutch 34 is provided which rotates integrally with the turbine runner 24. A dumper 36 is provided in the lock-up clutch 34 to ease impact in the direction of revolution. When the hydraulic pressure in the clutch pressure chamber 38, formed between the lock-up clutch 34 and the converter housing 20 in close proximity to which the lock-up clutch 34 is disposed, is discharged, the lock-up clutch 34 is brought into contact with the inner surface of the converter housing 20 to lock up the torque converter 16 by means of the hydraulic pressure as a torque transfer medium in the converter housing 20.

In this instance, the hydraulic pressure supplied to the converter housing 20 and the clutch pressure chamber 38 is controlled by a control valve assembly 40 (see FIG. 1) for selectively coupling and uncoupling various friction coupling elements which are used to shift gears of the automatic transmission 14. As shown in detail in FIG. 2, the control valve assembly 40 includes a lock-up valve 42 for controlling supplying and discharging of hydraulic pressure to the clutch pressure chamber 38 and the converter housing 20.

The lock-up valve 42 is equipped with line pressure ports 42a and 42b to which line pressure developed by adjusting discharge pressure of the pump 44 by means of a pressure regulating valve 46 is introduced, a clutch pressure port 42c in connection to the clutch pressure chamber 38, a converter pressure port 42d in connection to the converter housing 20, and a drain port 42e adjacent to the clutch pressure port 42c. Furthermore, the lock-up valve 42 opens and closes selectively the respective ports and shuts the line pressure port 42a and clutch pressure port 42c. A return spring 50 is disposed in the lock-up valve 42 on one end of a spool 48 and urges the spool 48 in a direction in which it brings the clutch pressure port 42c into communication with the drain port 42e.

On the other hand, control pressure regulated by a solenoid valve 52 is introduced into the lock-up valve 42 at the other end of the spool 48 so as to force the spool 48 against the return spring 50. The solenoid valve 52 is configured as an "on drain" type of solenoid valve and is operated by an on-off duty signal. Accordingly, by making the proportion of an ON signal (the duty rate) of the duty signal larger, i.e. changing the duty rate toward 100% from 0%, the moved distance of the spool 48 toward the right becomes larger, increasing the discharged amount of hydraulic pressure from the clutch pressure chamber 38, and hence the difference in pressure between the inside of the converter housing 20 and the clutch pressure chamber 38. In this instance, in the lock-up valve 42, the pressure at the clutch pressure port 42c acts as an auxiliary pressure on one end of the spool 48 via an orifice 54. In addition, part of the working oil which is discharged after circulation in the converter housing 20 returns to an oil pan via a pressure-maintaining valve 56 and an oil cooler 58. Furthermore, a portion of the working oil which is supplied from the converter pressure port 42d is directed to the oil cooler 58 via an orifice 60.

A duty signal, which is an output from a lock-up pressure adjustment means 61 mainly comprised of a microcomputer shown in FIG. 1, is sent to the solenoid valve 52. Various signals including a signal representative an engine speed of revolutions ("NE"), a signal representative of a gear ("gear") selected, a turbine speed of revolutions ("TREV"), and engine torque ("TE") which are detected by an engine speed sensor 68, a gear position sensor 66, a turbine speed sensor 64 and an engine torque sensor 62, respectively, are sent to the lock-up pressure adjustment means 61. The duty rate "luduty" of the duty signal is computed from these signals.

Figure 3:
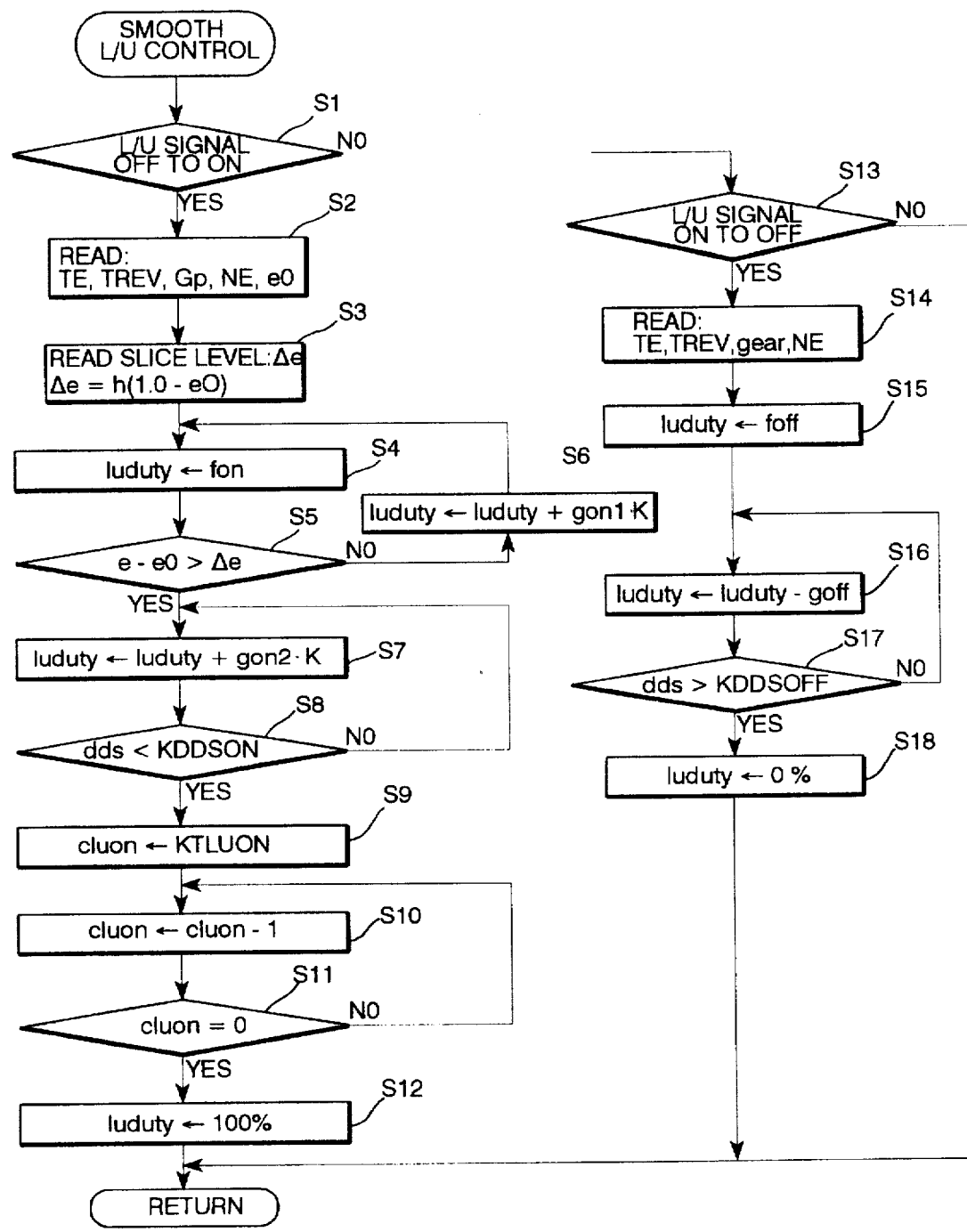
FIG. 3 is a flowchart illustrating a sequential lock-up control for the lock-up clutch of FIG. 2.

In the lock-up control, computation of the duty rate "luduty" by the lock-up pressure adjustment means 61 is executed in accordance with a sequence routine illustrated by a flowchart in FIG. 3. In the flowchart, control of the duty rate "luduty" is executed from step S1 through step S12 during locking up and from step S13 through step S18 during unlocking.

Determination is first made at step S1 as to whether or not a lock-up signal has switched from OFF to ON, and when there has caused a switch of the lock-up signal to ON or the answer to the decision is "YES", then, at step S2, various signals representative of the engine torque "TE", the turbine speed "TREV", the gear position "gear" and the engine speed "NE" are read. A speed ratio e0 between the turbine speed "TREV" and the engine speed "NE" at the moment the lock-up signal switches from OFF to ON is also read.

Subsequently, at step S3, a slice level Δe for changing a slope with regard to an initial speed ratio e0 immediately after the lock-up signal has become ON is read. The term "slice level Δe" shall refer to a value used to detect the degree of lock-up and is computed by h(1.0−e0) using the initial speed ratio e0 when the speed ratio e varies from 0 to 1. Here, h is a predetermined adjustment coefficient.

At step S4, the initial control value "fon" upon an occurrence of locking operation of the lock-up clutch 34 is determined as a duty rate "luduty" on the basis of the engine speed "TE", the turbine speed "TREV", and the gear position "gear". The initial control value "fon" is set to a value immediately prior to contact of the lock-up clutch 34 with the inner surface of the converter housing 20 and becomes larger with increases in the engine torque "TE" and in the turbine speed "TREV". At step S5, a determination is subsequently made as to whether or not the difference between a current speed ratio e and the initial speed ratio e0 exceeds the slice level Δe. When the difference (e−e0) is not exceeded or the answer to the decision is "NO," then, at step S6, the duty rate "luduty" is set to a rate of locking pressure increase "gon1" which is of a front half portion A of the duty change characteristic shown in FIG. 4. On the other hand, if the difference (e−e0) is greater than or equal to the slice level Δe at step S5 or the answer is "YES," the sequence control advances to step S7 where the duty rate "luduty" is set to a rate of locking pressure increase "gon2" which is of a latter half portion B of the duty change characteristic in FIG. 4. Accordingly, in the control of the present embodiment, it is possible to determine simply the slippage state based on which a timing of switching between the rates of locking pressure increase "gon1" and "gon2" is judged, that is to say, the state of the speed difference between an output speed of the engine 12 and an input speed of the automatic transmission 14, using the difference (e−e0) between the current speed ratio e and the initial speed ratio e0.

The rates of locking pressure increase "gon1" and "gon2" of the duty rate "luduty" are each determined in accordance with engine torque "TE", turbine speed "TREV", and gear position "gear", and become larger accompanying increases in the engine torque "TE" and in the turbine speed "TREV," the rate of locking pressure increase "gon1" being set small and the rate of locking pressure increase "gon2" being set large. In addition, the slice level Δe becomes less likely to receive the influence of rising differential lock-up pressure, the larger the engine load becomes, and, consequently, it is possible to delay the switching timing of the slope from "gon1" to "gon2". At steps S6 and S7, the rate of locking pressure increase in the duty rate "luduty" is obtained as "gon1" and "gon2", both depending upon the engine torque "TE," the turbine speed "TREV," and the gear position "gear." In the flowchart in FIG. 3, "K" indicates the learning coefficient of gradual increase. After the rate of locking pressure increase of the duty rate "luduty" has been determined at step S6 or S7, a determination is made at step S8 as to whether or not the current slippage "dds," which is computed from the difference between the engine speed "NE" and the turbine speed "TREV," is smaller than a predetermined value "KDDSON" set for forced lock-up operation. When the slippage "dds" is not less than the value "KDDSON," the sequence control returns to step S7 and maintains the rate of locking pressure increase of the duty change characteristic B. On the other hand, when the slippage "dds" has reached the value "KDDSON," a timer is caused to start to count a time through steps S9 to S11. Specifically, the timer "cluon" is set to an initial value "KTLUON" at step S9 and changed by a decrement of 1 at step S10. Thereafter, a determination is made at step S11 as to whether or not the timer "cluon" has become 0. When the timer count "cluon" has not become 0, ot the answer to the decision is "NO," the sequence control returns to step S10 and repeats the decrement of the timer count "cluon". On the other hand, when the timer count "cluon" has become 0, i.e. the answer is "YES," then, the duty rate "luduty" is reset to 100% at step S12. Accordingly, by thus resetting the duty rate "luduty" to 100%, the hydraulic pressure in the clutch pressure chamber 38 is discharged completely through the drain port 42e of the lock-up valve 42, developing the greatest locking pressure of the lock-up clutch 34.

On the other hand, when the lock-up (L/U) signal has not switched from OFF to ON in the determination at step S1, another determination is made at step S13 as to whether or not the lock-up signal has been switched from ON to OFF. Furthermore, when the lock-up (L/U) signal has been switched from ON to OFF, i.e. the answer to the decision is "YES," signals representative of an engine torque "TE," a turbine speed "TREV," a gear position "gear," and an engine speed "NE" are read at step S14. Subsequently, at step S15, an initial control value "foff" upon an occurrence of unlocking operation is set as a duty rate "luduty". In this instance, the initial control value "foff" is set to a value immediately prior to separation of the lock-up clutch 34 from the inner surface of the converter housing 20 on the basis of the engine torque "TE," the turbine speed "TREV" and the gear position "gear", and the control value "foff" becomes larger as the engine torque "TE" and/or the turbine speed "TREV" decline.

Figure 5:
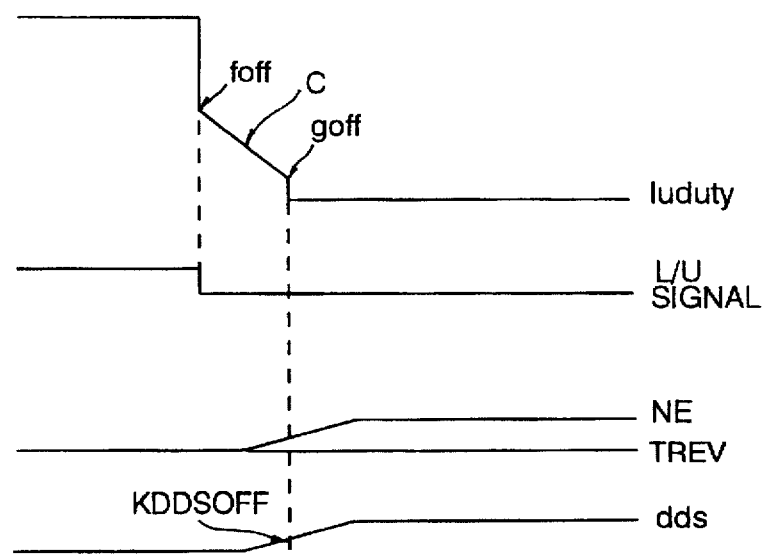
FIG. 5 is a time chart of the factors necessary to control the elements that are necessary to cause unlocking operation of the lock-up clutch of FIG. 3.

At step S16, the rate of decrease "goff" of the duty rate "luduty" from the initial control value is set in accordance with the engine torque "TE," the turbine speed "TREV" and the gear position "gear". Here, the rate of decrease "goff" is indicated by the duty change characteristic C as shown in FIG. 5 and becomes larger as the engine torque "TE" and/or the turbine speed "TREV" increase. Thereafter, at step S17, a determination is made as to whether or not the current slippage "dds" is larger than a predetermined value "KDDSOFF" during unlocking and, when the slippage "dds" has not reached the predetermined value "KDDSOFF," then, the sequence control returns to step S16 and maintains the rate of decrease "goff". On the other hand, when the slippage "dds" has reached the predetermined value "KDDSOFF," the duty rate "luduty" is reset to 0% at step S18.

Figure 6:
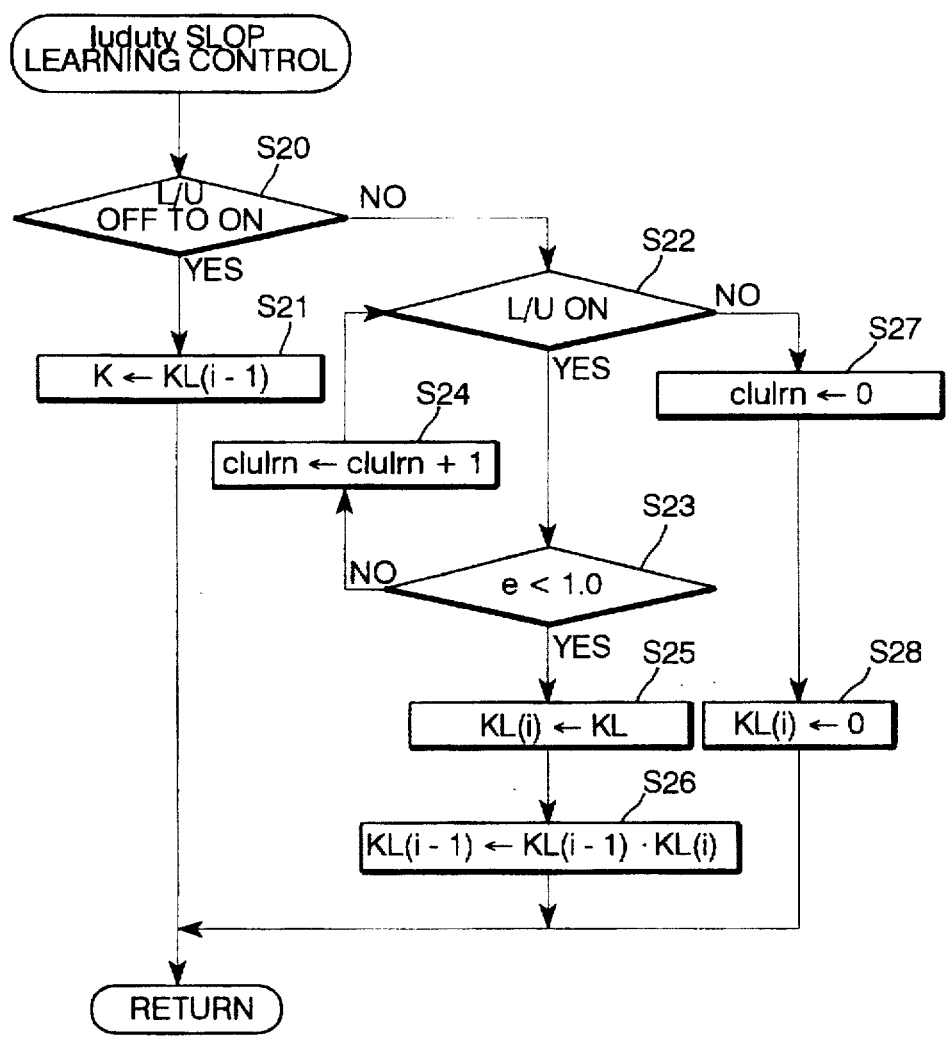
FIG. 6 is a flowchart illustrating a learning control subroutine conducted during lock-up control.

In the sequence control, a learning coefficient K of a gradual increase of the duty rate, which is used at steps S6 and S7 when the lock-up control is conducted, the slope learning control of duty rate "luduty" is executed by a subroutine illustrated by a flowchart in FIG. 6.

In the slope learning control subroutine, at step S20, a determination is made as to whether or not the lock-up (L/U) signal has switched from OFF to ON. When the lock-up signal has switched or the answer to the decision is "YES," the control sequence returns after setting the previous learning value KL(i−1) to the learning coefficient K of gradual increase. On the other hand, when the answer to the determination at step S20 is "NO," another determination is made at step S22 as to whether or not the lock-up (L/U) signal is in an ON state which indicates that the lock-up clutch 34 is under a locked condition in which the torque converter 16 is not in its converter state, and, when the ON state is preset, a further determination is made at step S23 as to whether or not the current speed ratio e which has been monitored is smaller than 1.0, i.e. whether or not the lock-up clutch 34 has completely locked up the torque converter 16. When the speed ratio e is less than 1.0, this indicates that the lock-up clutch 34 has completely locked the torque converter 16, the slope learning counter "clulrn" of the duty rate "luduty" is changed by an increment of 1 at step S24. Thereafter, the control sequence returns to step S22 again.

Figure 7:
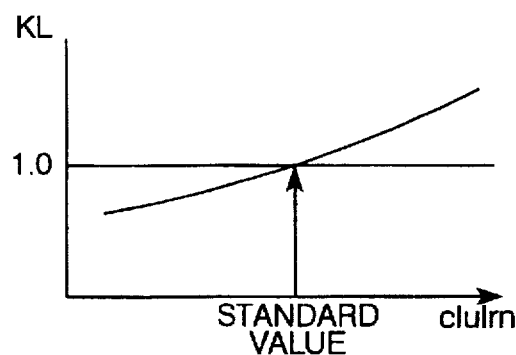
FIG. 7 is a diagram of the characteristics of slope adjustment coefficient used in the learning control.

When the lock-up clutch 34 is completely locked and, consequently, the speed ratio e has become 1.0 at step S23, the slope adjustment coefficient KL shown in FIG. 7 is set as the current learned slope adjustment coefficient KL(i) at step S25. In this instance, the slope adjustment coefficient KL is larger than 1.0 when a counted time is longer than a standard time as shown in FIG. 7 and smaller than 1.0 when the counted time is shorter than the standard time. Subsequently, at step S26, the previously learned slope adjustment coefficient KL(i−1) is set to a value obtained by multiplying the previous learning value KL(i−1) by the current learning value KL(i) set at step S25. Thereafter, the control sequence returns.

Figure 8:
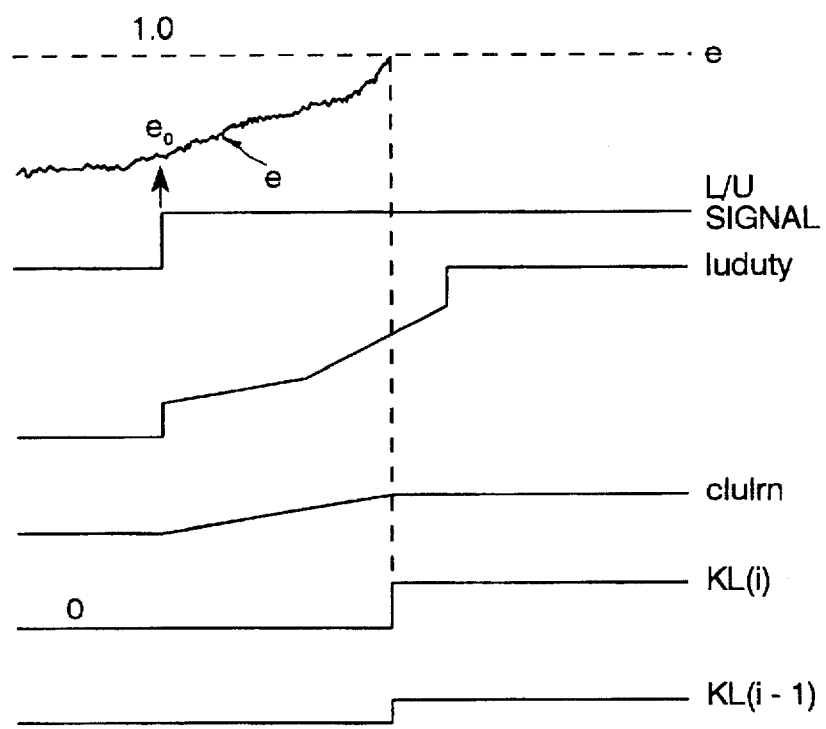
FIG. 8 is a time chart of various factors necessary to control the elements during a learning control.

In this instance, when the answer to the determination at step S22 is "NO," i.e. the lock-up (L/U) signal is not in the ON state in which the torque converter 16 is in its converter state, the slope learning counter "clulrn" is cleared at step S27 and the current learning value KL(i) is cleared as well at step S28, following which the control sequence returns. Accordingly, with the slope learning control of FIG. 6, the respective characteristics are shown by a time chart in FIG. 8.

Figure 4:
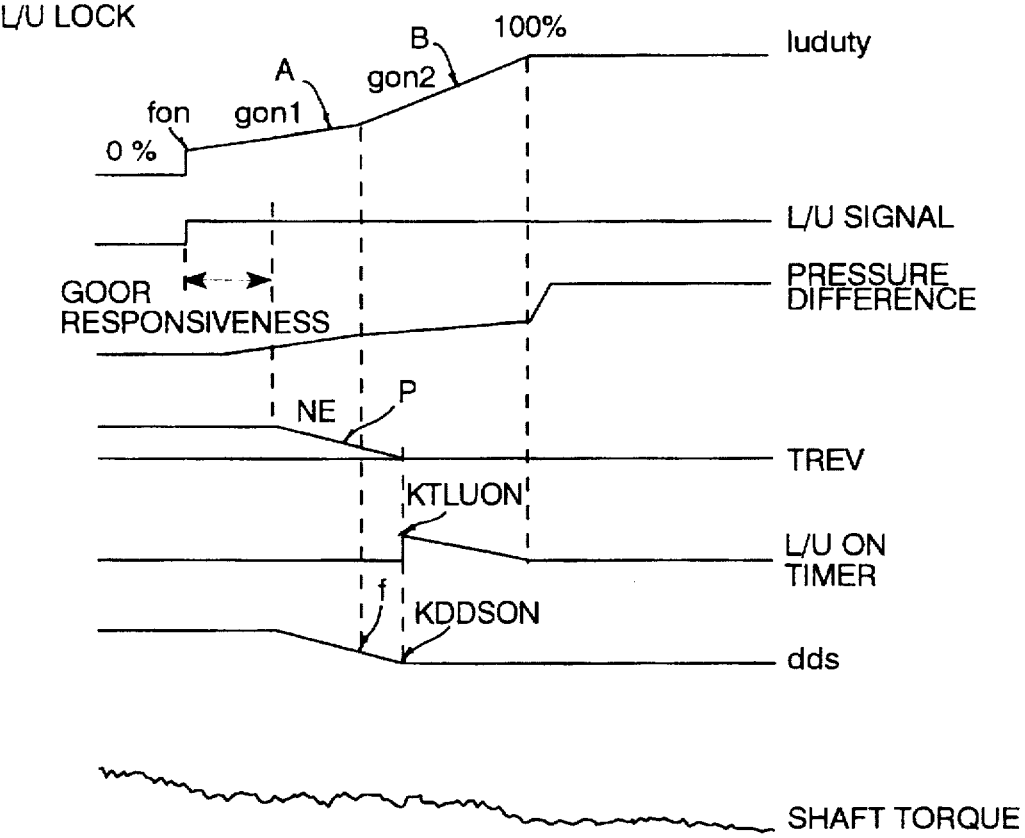
FIG. 4 is a time chart of various factors necessary to control elements that are necessary to cause locking operation of the lock-up clutch of FIG. 3.

In the lock-up control system 10 thus structured, the locking pressure adjustment means 61 sets the duty rate "luduty", i.e. the level of locking pressure, to a small value "gon1" at the early stage of locking according to the rate of locking pressure increase in the duty change characteristic shown in FIG. 4 during the early stage of locking the lock-up clutch 34 and, on the other hand, to a large value "gon2" during the later stage of locking of the lock-up clutch 34. As a result, the speed at which the lock-up clutch 34 operates with hydraulic pressure inside the converter housing 20 is controlled during the early stage of locking and, consequently, the inertial force which acts on the lock-up clutch 34 is greatly reduced, so that a decrease in the engine speed "NE" becomes gentle as shown by a reference P in FIG. 4, resulting in prevention of large fluctuations in the shaft torque during locking operation of the lock-up clutch 34 accompanying an inertial force and a considerable reduction in impact during locking operation of the lock-up clutch 34.

Furthermore, because the locking pressure increases with at a high rate of locking pressure increase "gon2" during the later stage of locking and, consequently, the contact force of the lock-up clutch 34 against the inner surface of the converter housing 20 is made large after locking of the lock-up clutch 34, slippage of the lock-up clutch 34 relative to the converter housing 30 and heat generated through slippage are effectively reduced, preventing the lock-up clutch 34 from causing seizure. In addition, with the control system, because the duty rate "luduty" upon the switch of the lock-up signal from OFF to ON is substituted for an initial value "fon" the hydraulic pressure discharged from the clutch pressure chamber 38 becomes larger by an amount according to the initial value, so as to improve the responsiveness of the lock-up clutch 34 until the lock-up clutch 34 finally locks the torque converter and enable quick locking.

Together, with the lock-up control system 10, steps S9 through S11 functioning as a timer means makes the level of locking pressure i.e. duty rate "luduty", maximum (100%) after a predetermined interval of time from when slippage "dds" computed from the difference between the engine speed "NE" and the turbine speed "TREV," reaches a predetermined near lock-up state (slippage "KDDSON" for the determination of forced locking-up), enabling the lock-up clutch 34 to lock reliably the torque converter 16 in a short period of time without shocks. Because the slope of duty value "luduty" is learned and controlled through sequential control illustrated by the subroutine in FIG. 6, it is enabled to keep constant an interval from the appearance of a lock-up ON signal to the completion of locking-up without any influence of changes due to aging. As shown in FIG. 3, the locking pressure adjustment means 60 is adapted so as to execute the unlocking control through steps S13 to S18 where the duty rate "luduty" is caused to fall from the initial value "foff" which is set when the lock-up (L/U) signal is switched from ON to OFF and the unlocking control is executed with the rate of decrease "goff" from the time of falling. This is also contributory to improvement of the unlocking responsiveness and quick unlocking of the lock-up clutch 34. In addition, with the unlocking control, because the duty rate "luduty" is set to 0% when slippage "dds" becomes at least as great as the predetermined value "KDDSOFF" during separation of the lock-up clutch 34 from the converter housing 20, it is possible to greatly reduce a time for which slippage is allowed with regard to the lock-up clutch 34 even shorter, preventing aggravation of separation of the lock-up clutch 34 from the converter housing 20.

Figure 9:
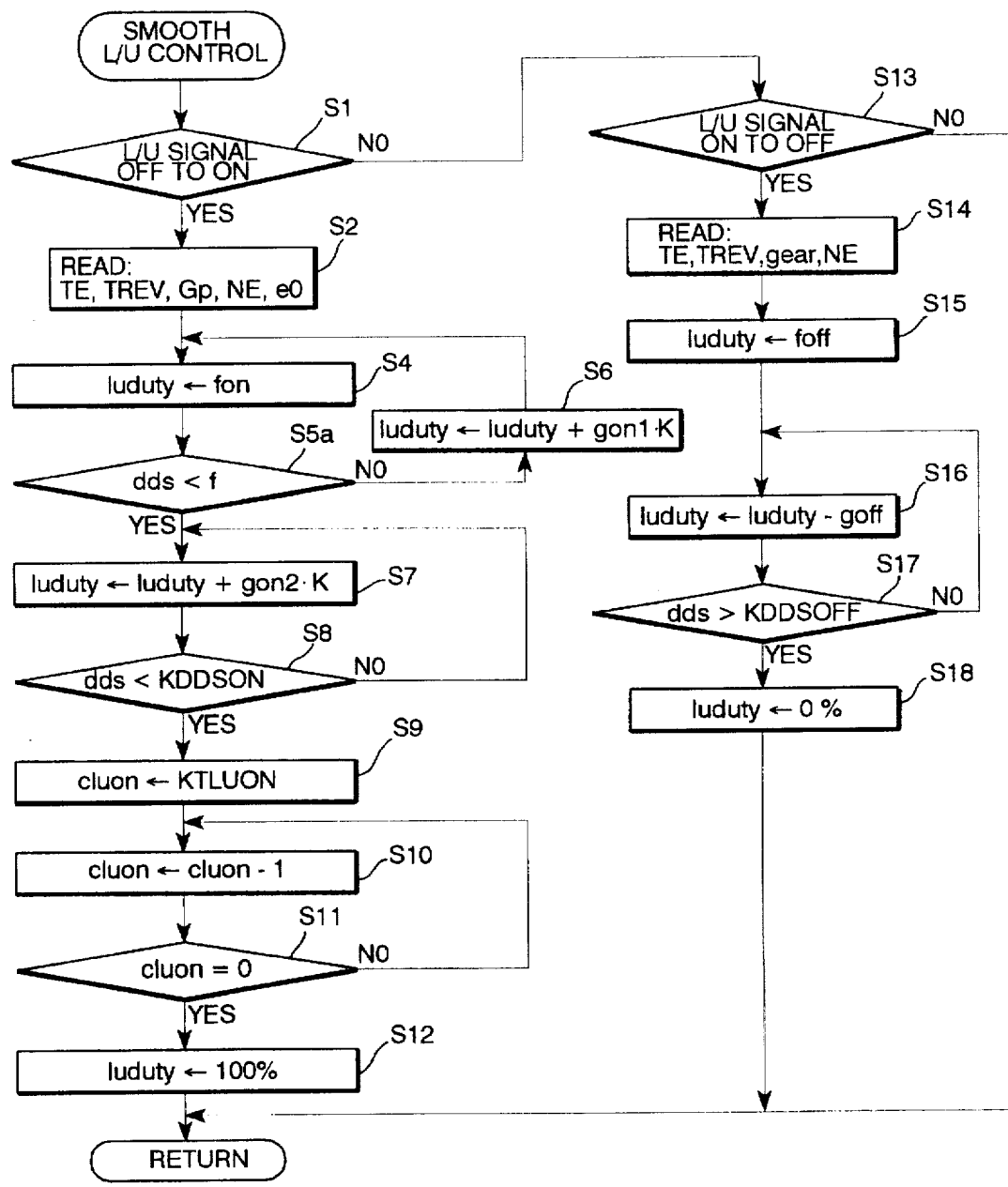
FIG. 9 is a flowchart illustrating another sequential lock-up control for the lock-up clutch of FIG. 2.

FIG. 9 is a flowchart illustrating a lock-up control sequence routing in which the same reference numbers have been used to denote the same or similar steps as in FIG. 3. In order to avoid a redundant description, the following description will be directed to steps different from those in FIG. 3. While the decision is made at step S5 in the flowchart in FIG. 3 concerning a slice level Δe with respect to the difference (e−e0) between a current speed ratio e and an initial speed ratio e0, in order to detect the state of slippage of the torque converter 16, in other words the speed difference between an engine output speed and an automatic transmission input speed, the state of slippage is determined at step S5a in the sequence control in FIG. 9 based on slippage "dds" obtained from the difference between an engine speed "NE" and a turbine speed "TREV." Specifically, at step S5a, slippage "dds" and a standard value f computed in accordance with an engine torque "TE" and a gear position "gear" are compared with each other. When the slippage "dds" is at least as great as the standard value f, i.e. the answer is "NO," this indicates that the lock-up clutch 34 is at its early stage of locking, then, the control routine forwards to step S6 where the rate of locking pressure increase is set to a small rate of locking pressure increase "gon1" and, on the other hand, when the slippage "dds" is smaller than the standard value f or the answer to the decision is "YES," this indicates that the lock-up clutch 34 is at the later stage of locking, then, the control sequence progresses to step S7 wherein the rate of locking pressure increase is set to a large rate of locking pressure increase "gon2". In the control sequence of the flowchart in FIG. 9, the decision made at step S5a makes it unnecessary to read a slice level Δe at step S3 in the control sequence of the flowchart in FIG. 3.

The lock-up control system for the fluid coupling controls appropriately the speed of operation of the lock-up clutch during the early stage of locking is satisfactorily controlled and provides a great reduction in inertial force acting on the lock-up clutch, so as to control fluctuations in engine speed when the lock-up clutch causes locking operation accompanying inertial force and, consequently, greatly reduce shocks during locking, thereby yielding improve feelings of driving. In addition, the locking pressure increased at an enhanced rate during the later stage of locking reduces slippage of the lock-up clutch prevents seizure of the clutch.

It is to be understood that although the present invention has been described with regard to preferred embodiments thereof, various other embodiments and variants may occur to those skilled in the art, which are within the spirit and scope of the present invention, and such other embodiments and variants are intended to be covered by the following claims.

What is claimed is:

1. A lock-up control system for a fluid coupling interposed between an engine and automatic transmission, said fluid coupling including a lock-up clutch interposed between an engine torque input member and an engine torque output member of said fluid coupling and being locked up by said lock-up clutch so as to directly couple said engine and said automatic transmission together, said lock-up control system comprising locking pressure control means for setting a rate of locking pressure increase, at which a locking pressure necessary for said lock-up clutch to lock up said fluid coupling increases during locking of said fluid coupling, during a time period prior to synchronization of engine and turbine speeds wherein said locking pressure increase is small at an early stage of said locking-up of said fluid coupling during said time period and said locking pressure increase is large at a later stage of said locking-up of said fluid coupling during said time period.

2. A lock-up control system as defined in claim 1, wherein at least one of said locking pressure and said locking pressure changing rate is determined based on at least one of an engine output torque, a speed of said engine torque output member of said fluid coupling, and a gear to which said automatic transmission has been shifted.

3. A lock-up control system as defined in claim 2, wherein said locking pressure control means includes a timer to count a predetermined time after said fluid coupling comes close to a state of slippage allowed when said fluid coupling is completely locked and develops the greatest level of said locking pressure when said timer counts up said predetermined time.

4. A lock-up control system as defined in claim 1, wherein a timing of changing said rate of locking pressure increase between said early stage of said locking and said later stage of said locking is determined according to slippage allowed between said engine torque input member and said engine torque output member of said fluid coupling.

5. A lock-up control system as defined in claim 4, wherein at least one of said locking pressure and said locking pressure changing rate is determined at least one of an engine output torque, a speed of said engine torque output member of said fluid coupling, and a gear to which said automatic transmission has been shifted.

6. A lock-up control system as defined in claim 4, wherein said locking pressure control means includes a timer to count a predetermined time after said fluid coupling comes close to a state of slippage allowed when said fluid coupling is completely locked and develops the greatest level of said locking pressure when said timer counts up said predetermined time.

7. A lock-up control system as defined in claim 4, wherein said slippage is determined based on a difference between an output speed of said engine and an input speed of said automatic transmission.

8. A lock-up control system as defined in claim 7, wherein said locking pressure control means includes a timer to count a predetermined time after said fluid coupling comes close to a state of slippage allowed when said fluid coupling is completely locked and develops the greatest level of said locking pressure when said timer counts up said predetermined time.

9. A lock-up control system as defined in claim 7, wherein at least one of said locking pressure and said locking pressure changing rate is determined at least one of an engine output torque, a speed of said engine torque output member of said fluid coupling, and a gear to which said automatic transmission has been shifted.

10. A lock-up control system as defined in claim 4, wherein said slippage is determined based on a ratio between an output speed of said engine and an input speed of said automatic transmission.

11. A lock-up control system as defined in claim 10, wherein at least one of said locking pressure and said locking pressure changing rate is determined at least one of an engine output torque, a speed of said engine torque output member of said fluid coupling, and a gear to which said automatic transmission has been shifted.

12. A lock-up control system as defined in claim 10, wherein said locking pressure control means includes a timer to count a predetermined time after said fluid coupling comes close to a state of slippage allowed when said fluid coupling is completely locked and develops the greatest level of said locking pressure when said timer counts up said predetermined time.

* * * * *